United States Patent [19]

Yamamichi et al.

[11] 4,327,982
[45] May 4, 1982

[54] DEVICE FOR SUPPRESSING MIRROR BOUNCE IN SINGLE LENS REFLEX CAMERA

[75] Inventors: Masayoshi Yamamichi, Kawasaki; Masayuki Suzuki; Hiroyasu Murakami, both of Tokyo; Tadashi Ito, Yokohama, all of Japan

[73] Assignee: Canon Kabushiki Kaisha, Tokyo, Japan

[21] Appl. No.: 182,804

[22] Filed: Aug. 29, 1980

Related U.S. Application Data

[63] Continuation of Ser. No. 965,428, Dec. 1, 1978, abandoned.

[30] Foreign Application Priority Data

Feb. 7, 1978 [JP] Japan .................................. 53-12737

[51] Int. Cl.³ ............................................. G03B 19/12
[52] U.S. Cl. .................................................. 354/156
[58] Field of Search ........................ 354/152, 153, 156

[56] References Cited

U.S. PATENT DOCUMENTS 2,579,247 12/1951 Angenieux .......................... 354/156
3,653,311 4/1972 Sato .................................... 354/156

*Primary Examiner*—L. T. Hix
*Assistant Examiner*—Thomas H. Tarcza
*Attorney, Agent, or Firm*—Toren, McGeady and Stanger

[57] ABSTRACT

A device for suppressing bounce of a pivotable mirror in a single lens reflex camera including a suppression member which may be pivotally moved into a position tending to hold the mirror against a stopper member as the mirror effects contact therewith, thereby to prevent mirror bounce when the mirror strikes the stopper. The suppression member includes an arcuate cam surface which is spring biased into engagement with a follower member on the mirror.

8 Claims, 5 Drawing Figures

DEVICE FOR SUPPRESSING MIRROR BOUNCE IN SINGLE LENS REFLEX CAMERA

This is a continuation of application Ser. No. 965,428, filed Dec. 1, 1978, now abandoned.

BACKGROUND OF THE INVENTION

The present invention relates generally to single lens reflex cameras and more particularly to a mechanism for preventing or suppressing bounce or vibration of the mirror of such a camera when the mirror strikes stopper means located at one of two end positions of the mirror.

Generally, pivotable or tiltable mirrors of a single lens reflex camera are located between the camera objective lens and the camera shutter. In operation, the mirror of a single lens reflex camera is arranged to be moved between a first position where viewing of an object by a photographer may be effected through the mirror, with the mirror being located to block the optical path between the lens and film to be exposed. When an exposure operation is to occur, the mirror is pivoted out of the optical path and is then returned to its initial position to enable pre-exposure viewing of a subsequent photograph.

Thus, in a single lens reflex camera, the pivotable mirror located between the camera objective and the shutter is moved from a non-viewing position to a viewing position after each exposure has been completed. Generally, the motion of the mirror to the viewing position occurs by the action of its own weight augmented by the force of a return spring. Conventional mirror control mechanisms allow for the mirror to bounce from a stopper which usually defines the end position of the mirror at which the mirror is located to enable viewing through the lens of the camera. Since the time interval through which the repeated bouncing or vibration of the mirror occurs is extremely short when compared with the period of time involved in manually effecting one cycle of film winding operation and shutter cocking, the vibratory motion which the mirror undergoes does not tend to create serious problems with regard to exposure control.

Recently however automatic exposure control by utilization of motor drive mechanisms has become more and more popular. As a result, the high speed continuous succession of frame exposures occurring in this type of exposure operation has created a strong and growing demand for stabilization of mirror movement and suppression of the vibratory motion which the mirror tends to undergo when brought to the viewing position. This demand arises since without it improper exposures have tended to occur in a small proportion of the exposed frames as a result of a reduction in the accuracy of the exposure control. Vibratory or bouncing motion of the mirror tends to cause light coming from the objective lens to be shifted to a significant extent from the path of a photoelectric sensor which constitutes part of a TTL type of light metering system. In such systems, the signal from the sensor must be picked up in a very short time interval in order to derive an appropriate exposure value.

Thus, the present invention is intended to provide a device for stabilizing the movement of the tiltable mirror against vibratory motion when the mirror is returned to its viewing position.

A further aim of the invention is to provide a single lens reflex camera with a mirror bounce suppression device which will make it possible to successfully effect high speed continuous frame exposures while permitting an automatic exposure control apparatus to derive accurate and reliable exposure values.

SUMMARY OF THE INVENTION

Briefly, the present invention may be described as a bounce suppression device for a tiltable mirror unit of a single lens reflex camera comprising means pivotally mounting the mirror unit for operative movement within the camera between two end positions, stopper means positioned to engage the mirror unit at at least one of said two end positions, a suppression member adapted to be moved to a bounce suppression position into engagement with the mirror unit when the mirror unit is moved into engagement with the stopper means to apply a force tending to hold the mirror unit against the stopper means at said at least one of said two end positions, and spring means biasing the suppression member toward the bounce suppression position. The suppression member is adapted for movement out of the bounce suppression position to permit the camera to move away from the stopper means toward the other of the two end positions when a frame exposure operation is to be effected.

The suppression member is formed with an arcuate cam surface and the spring means tend to bias the suppression member to bring the cam surface into engagement with a follower member on the mirror unit. When the mirror is brought toward the viewing position, the follower member abuts the cam surface to overcome the spring force of the spring means thereby to move the suppression member out of the path of the follower member and when the mirror approaches its end position against the stopper mean, the spring means act agains the suppression member to bring it into the bounce suppression position tending to hold the mirror firmly against the stopper means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF PREFFERED EMBODIMENTS

Figure 1:
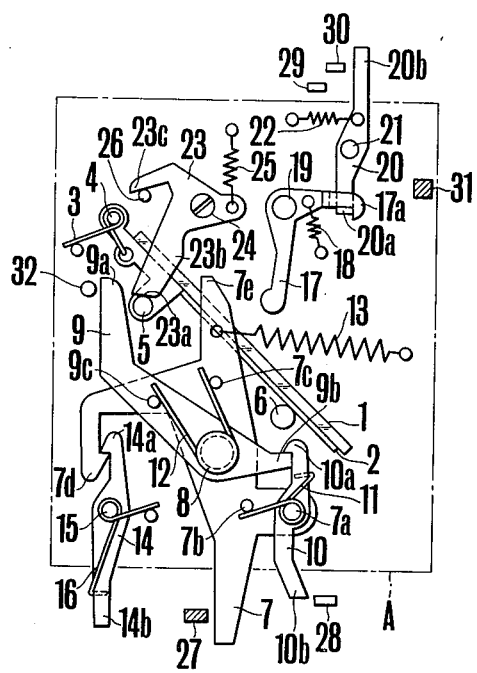
FIG. 1 is a schematic elevational view depicting the overall mechanism of the invention including the bounce suppression device with the mirror shown in the shutter cocked position to enable viewing of an object through the mirror and the camera lens.
Figure 2:
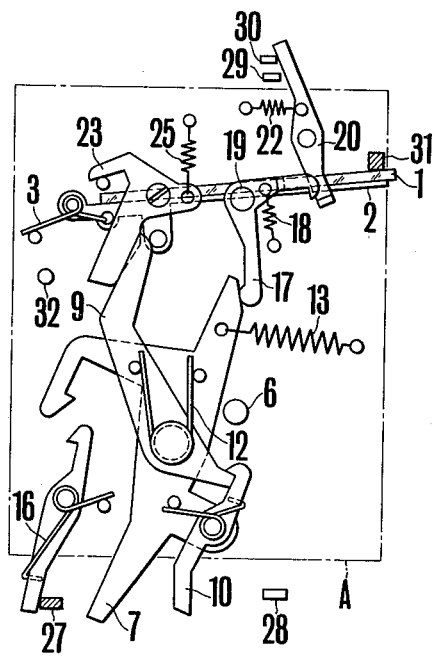
FIG. 2 is a view similar to that of FIG. 1 showing the apparatus in a shutter released position where the mirror is flipped up out of the optical path of the camera.
Figure 3:
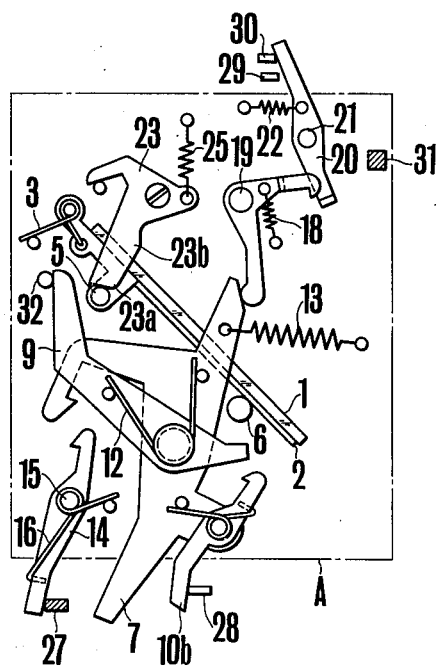
FIG. 3 is a view similar to the views of FIGS. 1 and 2 depicting the action of the bounce suppression device when the mirror is returned to the viewing position after the shutter is closed.

Referring now to FIGS. 1–3, wherein like reference numerals are used to refer to identical parts in each figure, there is shown an embodiment of the invention wherein bounce suppression action may be effected in the tiltable viewing mirror of a single lens reflex camera. A viewing mirror 1 is fixedly attached on the upper surface of a plate 2 which is pivotally mounted on stub shafts 4 having a helical torsion spring 3 arranged thereabout in order to apply a spring force for returning the mirror to a viewing position which is depicted in FIGS. 1 and 3. In this position, mirror 1 lies within the optical path between an exposure aperture (not shown) and a camera objective lens (not shown) with the mirror being oriented at an angle of approximately 45° with respect to the optical axis of the lens when the mirror is in the viewing position. Stopper means in the form of a stopper pin 6 affixed to a panel A defines the end of the path of movement of the mirror at the viewing position.

A drive lever 7 is pivotally mounted upon a common shaft 8 of a latch lever 9 which has an arm 9a adapted to cooperate with a pin 5 extending from the mirror supporting plate 2. A mirror return control lever 10 is pivotally mounted on an axle 7a with a spring 11 surrounding the axle 7a being provided to spring bias the control lever 10 in one direction of movement about the axle 7a. The spring 11 has one extremity or end thereof bent around one arm of the lever 10, with the other end of the spring 11 being anchored to a pin 7b located on the drive lever 7.

With the camera in a condition ready to effect an exposure operation, a pawl 10a of the mirror return control lever 10 is engaged with another arm 9b of the two-armed latch lever 9 by the action of a spring 12 compressed between pins 7c and 9c. Connected on another arm 7e of the drive lever 7 is one end of an operating spring 13, with the other end of the spring being connected to the panel A of the mirror unit upon which the pivot or common shaft 8 is also mounted. Blocking of the drive lever 7 is obtained due to the fact that a release lever 14 engages with a pawl 14a a pawl 7d of the drive lever 7. The release lever 14 is pivoted at a pin 15 on the panel A and is biased by a return spring 16 in a counterclockwise direction.

When the release lever 14 is turned clockwise by the action of an actuating member 27 which is moved to abut a tail 14b of the lever 14, after a desired setting of a diaphragm (not shown) is automatically effected, the latch lever 9 will be driven by the spring biased drive lever 7 to turn in a clockwise direction about the pivot axle 8 as a result of the interengagement effected between the levers 9 and 7 by the lever 10. As the lever 9 moves clockwise, the camming surface of the arm 9a of the lever 9 will bear against the pin 5. As a result, the mirror 1 will be moved from its initial or viewing position, depicted in FIG. 1, to a non-viewing or exposure position depicted in FIG. 2, at which position mirror 1 will be clear of the optical path of the camera and will lie almost parallel to the optical axis of the camera in abutting engagement with a second stopper 31 fixedly mounted upon the panel A.

Shortly before the mirror 1 reaches the end of its pivotal motion into the exposure position, an arm 7e of the drive lever 7 will come into abutting contact with a downwardly extending leg of an L-shaped lever 17 whereby the lever 17 will be turned about a pivot pin 19 in a counterclockwise direction against the action of a spring 18. Such movement of the lever 17 will cause disengagement of a pawl 17a from a rectangularly bent portion 20a of a shutter actuating lever 20 which, in turn, causes counterclockwise movement of the lever 20 about a pivot pin 21 under the action of a spring 22 in order thereby to actuate a shutter release control member 30 for movement thereof to the left as shown in FIG. 2. As a result, a shutter (not shown) is opened to effect exposure of a film frame.

After such exposure has been completed, the end of the shutter run is followed by clockwise movement of the mirror return control lever 10 as a result of actuation thereof by a member 28, as shown in FIG. 3. Such movement of the lever 10 causes disengagement of the pawl 10a from the latch lever 9. When the lever 10 is disengaged from the latch lever 9, the lever 9 will be turned conterclockwise under the action of the spring 12 in order to permit movement of the mirror 1 from the exposure position back to the viewing position under the force of gravity generated by the weight of the mirror unit and also under the supplemental action of the helical torsion spring 3.

In accordance with the present invention, there is provided a device for stabilizing the mirror 1 against vibratory or bouncing motion when the mirror is returned to the viewing position from the exposure position and when the mirror abuts against the stopper pin 6. This stabilizing device comprises a bounce suppression control member including a bounce suppression lever 23 arranged to cooperate with the pin 5 of the mirror unit comprised of the supporting plate 2 and the mirror 1. The lever 23 is pivotally mounted on an eccentric pin 24 and is formed to include a cam surface including a first camming section 23a and a second camming section 23b. The pin 24 serves to maintain a gap between the pin 5 and the first camming section 23a to as small a value as possible when the mirror is in the viewing position, provided that an arm 23c of the lever 23 is in contact with an abutment or stop pin 26 under the action of a spring 25, the spring 25 being connected between the lever 23 and the panel A.

In the course of tilting movement of the mirror 1, the lever 23 exerts a stabilizing action on the pin 5 immediately after the start of bearing engagement by the latch lever arm 9a with the pin 5. The force exerted to suppress tilting movement of the mirror 1 may be considered as composed of two components, one of which is directed opposite to the pivot pin 24 and the other of which has a direction perpendicular to that of the former. Though the former component is far larger in magnitude than the latter, a driving force extending in a direction tangent to the circular path of the pin 5 will not be cancelled. Additionally, the operating spring 13 being stronger than the bias spring 25 by a rather large factor results in the suppression lever 23 being first turned in a clockwise direction to escape out of the path of the pin 5. As the pin 5 moves upwardly beyond the slightly curved edge 23a, the suppression lever 23 is no longer effective to exert a counteraction on the pin 5. After that, the lever 23 is turned in a counterclockwise direction by the action of the spring 25 so that the pin 5 is moved upwardly in continuous contact with the section 23b of the camming surface of the lever arm.

Shortly after the start of the return movement of the mirror from the exposure position of FIG. 2, the pin 5 will engage against the surface of the second camming section 23b of the suppression lever 23 thereby to drive the lever 23 to turn in the clockwise direction against the force of the spring 25. At this time, the suppression lever 23 serves to exert a braking action on the mirror 1. From this time onward, just as the pin moves beneath the surface of the first camming section 23a, the front end of the mirror supporting plate abuts against the stopper 6 and there results thereby a tendency to suppress bouncing of the mirror off the stopper 6.

Thus, it will be noted that the suppression lever 23 provides a cam surface composed of the sections 23a and 23b and that the pin 5 operates essentially as a follower member of the mirror unit composed of the mirror 1 and the plate 2. As a result, the suppression action of the invention is achieved.

Figures 4, 5:
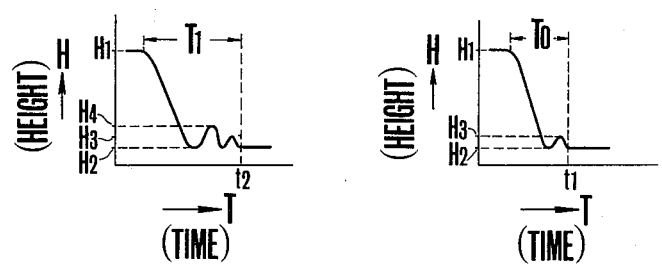
FIG. 4 is a graphic representation of the vibratory motion which will be experienced by a mirror in a camera not utilizing the bounce suppression device of the invention.
FIG. 5 is a graphic representation similar to that of FIG. 4 showing the advantageous damping action of the device of the present invention.

FIGS. 4 and 5 depict in graphical form the different characteristics between apparatus not including the suppression mechanism of the invention shown in FIG. 4 and the results achieved when the inventive suppression mechanism is applied, depicted in FIG. 5. With reference to FIG. 4 let it be assumed that a bounce suppression member 23 such as that described in connection with the present invention is not provided, as would be the case in prior art devices. Then, the mirror 1 would bounce from a height H2, corresponding to the position of the stopper 6, to a height H4, with this bounce occurring after the mirror has dropped from a height H1 corresponding to the position of the second stopper 31 at which there is initiated movement of the mirror from the exposure position to the viewing position.

Subsequently, the mirror is again driven by the spring 3 to abut against the stopper 6 from which the mirror will undergo a second bounce from the height H2 to a height H3, which although lower than the height H4 of the first bounce is, nevertheless, not negligible. The mirror will then reach a state of repose against the stopper 6 at a time $t_2$. Accordingly, with a prior art arrangement, the damping of vibratory motion of the mirror 1 to a point of zero bounce requires a considerably longer time $T_1$ when the mirror is set in motion during a cycle of operation.

In accordance with the present invention, when the stabilizing influence of the bounce suppression lever 23 is applied against vibratory motion of the mirror 1, when the mirror is returned from the exposure position to the viewing position the cooperation between the lever 23 and the pin 5 of the mirror supporting plate enables a bounce characteristic to be achieved as is depicted in FIG. 5. The tendency of the mirror to bounce is suppressed by the lever 23 to height H3 shown in FIG. 5 which is substantially lower than the height H4 shown in FIG. 4. Thus, vibratory motion of the mirror 1 will be damped to zero in a greatly reduced time interval $T_0$ and after a far smaller number of bounces of the mirror 1 from the stopper 6, less than would be otherwise possible without the application of the device of the present invention. It is to be noted that the difference between the heights H2 and H3 in FIG. 5 depends upon the magnitude of the gap between the pin 5 and the suppression lever 23 in the viewing position of FIGS. 1 and 3.

It will be seen from the foregoing that the present invention provides a reflex mirror bounce suppression device which assists in improving the accuracy and the reliability of the automatic exposure control particularly when a high speed continuous succession of frame exposures are to be made with a motor driven exposure control utilizing a motor driven unit employed in a single lens reflex camera.

While a specific embodiment of the invention has been shown and described in detail to illustrate the application of the inventive principles, it will be understood that the invention may be embodied otherwise without departing from such principles.

What is claimed is:

1. A bounce suppression device for a pivotable mirror of a single lens reflex camera comprising: means mounting said mirror for pivotal movement between two end positions, one of said positions being a viewing position; a cam follower member affixed with said mirror; a pivotally mounted spring biased cam member defining a cam surface engaged by said cam follower member to suppress bounce by said mirror when said mirror moves to said viewing position; said cam surface having a generally smooth arcuate contour along which said cam follower slides until said mirror reaches said viewing position where said mirror is held with said cam follower abutting said cam surface; and release means directly engaging said cam follower to move said cam follower in a direction away from said viewing position, said cam surface being shaped to permit said cam follower to move continuously in a direction away from said viewing position from the commencement of engagement of said release means with said cam follower without reverse movement in an opposite direction at least until said cam follower becomes released to allow said mirror to move to the other of said two end positions.

2. A bounce suppression device for a pivotable mirror unit of a single lens reflex camera comprising:
   a mirror;
   suppression means operatively engaged with said mirror for applying thereto a force for blocking movement of said mirror when said mirror moves to a viewing position;
   release means for releasing operative engagement between said mirror and said suppression means to permit rise of said mirror away from said viewing position; and
   projection means mounted on said mirror, said projection means being provided in the movement path of said release means so as to receive the force from the release means, and at a predetermined position above said mirror enabling engagement with said suppression means so as to retreat said suppression means to a predetermined position when the mirror departs from the viewing position.

3. A device according to claim 2 further comprising biasing means for urging said suppression means to a bounce suppression position which enables the operative engagement between said mirror and said suppression means.

4. A device according to claim 3 wherein said biasing means includes a spring member coupled to said suppression means.

5. A device according to claim 2 wherein said suppression means comprises an arcuate cam surface adapted for engagement with said projection means.

6. A device according to claim 5 wherein said projection means moves through a generally circular path during pivotal movement of said mirror.

7. A device according to claim 6 which further comprises stopper means positioned to engage said mirror at the viewing position of said mirror unit.

8. A device according to claim 7 wherein said suppression means is arranged to be taken out of said circular path of said projection means by sliding contact of said cam surface with said projection means when said mirror approaches contact with said stopper means.

* * * * *